United States Patent Office 3,293,313
Patented Dec. 20, 1966

3,293,313
METHOD OF MAKING ORGANIC LITHIUM COMPOUNDS
Walter Leonard Borkowski, Media, Pa., assignor to Foote Mineral Company, Exton, Pa., a corporation of Pennsylvania
No Drawing. Filed May 1, 1962, Ser. No. 191,453
9 Claims. (Cl. 260—665)

This is a continuation-in-part of my copending application Serial Number 85,994 filed Jan. 31, 1961, now abandoned.

This invention relates to a method of making lithium compounds, and more particularly, provides a novel method of making organolithium compounds which has important economic advantages.

It is known that organolithium compounds can be prepared by contacting lithium metal with an organic chloride. Lithium metal, however, is expensive. In this method of synthesis, half the metal is consumed in the formation of byproduct lithium chloride. The value of lithium is such that it is necessary to process this byproduct chloride to recover its lithium values, in order to make the process economical.

It is an object of this invention to provide an improved method for the preparation of organolithium compounds.

The particular object of this invention is to provide a novel method for the preparation of organolithium compounds wherein the byproduct produced is of substantially negligible economic value, and accordingly can be discarded without loss.

A further object of this invention is to provide a novel method for the preparation of organolithium compounds using a mixture of metals including lithium as a reactant, wherein selective formation of an organometallic compound in which the metal component is lithium occurs.

These and other objects will become evident from a consideration of the following specification and claims.

It has now been found that by reacting an organic halide with a mixture of lithium and sodium metals, an organolithium compound is selectively formed, and the byproduct of the reaction is the sodium salt. An equation illustrative of this stated reaction is:

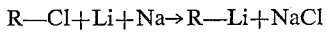

R—Cl+Li+Na→R—Li+NaCl where R is an organic radical, R—Li is an organolithium compound and NaCl is salt (sodium chloride).

The selectivity of the presently provided novel reaction is quite unexpected. There is essentially complete absence of organosodium compounds in the product. Generally the reaction will be conducted in a liquid medium. The organolithium product remains dispersed or dissolved in the liquid medium, and this solution or dispersion thereof is found to comprise substantially pure organolithium compound. The sodium salt byproduct crystallizes promptly and completely from the reaction mixture, and can readily be separated from the supernatant liquid layer comprising the organolithium compound, substantially free of organosodium compounds.

The stated novel process of this invention has important economic advantages over previously known methods for the preparation of organolithium compounds. Byproduct sodium chloride, in contrast to lithium chloride, is of negligible economic value and can simply be discarded. As pointed out above, the isolation of substantially pure product is also simple and readily accomplished, so that the method involves few manipulative procedures. Only half as much expensive lithium metal as in prior processes needs to be used in carrying out the preparation of the organolithium compound. The process gives very high yields of product. Thus the unexpectedly pronounced selectively of the reaction makes possible substantial decreases in the cost of production of organolithium compounds.

Any of a wide variety of organic halides can be converted to organolithium compounds by the process of this invention, including aliphatic (both acyclic and cycloalkyl), aromatic (including aryl, alkaryl, and aralkyl) and heterocyclic halides. Illustrative of aliphatic halides which may be used in the process of this invention are, for example, acyclic halides such as methyl chloride, ethyl chloride, isopropyl chloride, n-propyl chloride, n-butyl chloride, isobutyl chloride, amyl chloride, hexyl chloride, octyl chloride, isooctyl chloride, nonyl choride, decyl chloride, undecyl chloride, dodecyl chloride, hexadecyl chloride, 1,3-dichloropropane, 1,7-dichloroheptane, 1,5-dichloropentane, and so forth; and cycloalkyl halides such as cyclopentyl chloride, cyclohexyl chloride, bicyclohexyl chloride, methylcyclohexyl chloride, cyclohexylmethyl chloride, and so forth. Illustrative of presently useful aromatic halides are for example phenyl chloride, tolyl chloride, p-(t-butyl)phenyl chloride, p-(isopropyl) phenyl chloride, chloronaphthalene, methylnaphthyl chloride, propylnaphthyl chloride, β-chloroethylbenzene, diphenylmethyl chloride, and so forth. Steric hindrance may interfere with effectiveness of the reaction, and therefore primary halides are desirable. The process is not limited to the utilization of hydrocarbon halides. Heterocyclic halides and organic halides having substituent groups other than those made up solely of carbon and hydrogen can also be used, it only being necessary that such other groups are not reactive under the conditions of the method with the alkali metal dispersion or, desirably, with the organolithium product, to any substantial degree. For example, other presently useful organic halides include dichlorofuran, p-chloroanisole, chlorothiophene, p-chloro-N-dimethylaniline, and so forth. Use of chlorides helps avoid formation of Wurtz type byproducts, but other halides such as the bromides and iodides may be used in the reaction if desired. Illustrative of these are, for example, p-bromoanisole, phenyl bromide, butyl bromide, lauryl iodide, and so forth.

The metallic material with which the organic halide will be reacted will be a mixture of sodium and lithium metals. The ratio of these metals one to another may vary. To keep the organolithium compound product from being contaminated by organosodium compounds, it is necessary to provide an amount of lithium to the reaction which is at least a molar equivalent of the amount of organic halide reacted therewith. Sometimes a slight excess of lithium metal over a molar equivalent of organic halide will be employed, to facilitate completion of the conversion thereof to the organolithium compound. Either more or less sodium than lithium may be used. The reaction being selective, so long as the amount of organic halide reacted with the mixture of sodium and lithium does not exceed a molar equivalent of the amount of lithium present, the sodium may be present in an amount in excess of a molar equivalent of the amount of organic halide introduced without leading to contamination of the product by organosodium compounds. It is not essential to use an amount of sodium which is at least a molar equivalent of the amount of lithium in the mixture of the two. Still, to attain the economic benefits of this invention, it is generally desirable to avoid having substantial amounts of lithium metal lost in formation of byproduct lithium halide, as would be the case if a mixture consisting of a considerable excess of lithium metal over a molar equivalent thereof of sodium were reacted with an amount of organic halide in excess of a molar equivalent of the amount of sodium present in the mixture of metals. Thus, the metal mixture should comprise at least a substantial proportion of sodium. In general, per mole of organic halide to be converted to organolithium compound by reaction with a sodium-lithium mixture comprising at least one mole of lithium, the stated mixture should contain not more than about 3 moles of lithium per mole of sodium to avoid substantial uneconomic losses of lithium as byproduct lithium halide. The preferred ratio of lithium and sodium to one another in the mixture to be used in conducting the method of the invention will generally be equimolar.

The products of the present novel process will be organolithium compounds corresponding to the organic halide which is employed as a starting material. Thus, for example, aliphatic organolithium compounds which may be provided by the present method include methyllithium, ethyllithium, propyllithium, butyllithium, isobutyllithium, amyllithium, hexyllithium, decyllithium, lauryllithium, cyclohexyllithium, 1,6-hexamethylene dilithium and so forth. Illustrative of other oragnolithium compounds which may be produced are phenyllithium, tolyllithium, xylyllithium, β-lithioethylbenzene, naphthyllithium, methylnaphthyllithium, butylnaphthyllithium, dimethylnaphthyllithium, dilithionaphthalene, p-(t-butyl)phenyllithium, diphenylmethyllithium, 2,5-dilithiofuran, and so forth.

In carrying out the present process, the reactants need simply be contacted with one another. Since the alkali metals and also the organolithium products of the reaction can be spontaneously flammable, an inert liquid will ordinarily be used as a reaction medium. Conversion of an organic halide by reaction with an alkali metal can be accomplished simply by adding the organic halide to a vessel containing the metal, desirably cut in small chunks to increase its surface area, and generally covered by an inert liquid to protect it from the access of air in order to avoid spontaneous combustion of the metal. The reactivity of the metallic reactants can be much increased by reducing the particle size of the metal, which may be done by dispersing the metal in a liquid medium, and the use of a mixture of sodium and lithium in the present reaction in the form of dispersed metals is a preferred method of conducting the reaction.

Methods of forming dispersions of alkali metals in liquid media are well known in the art. They can be prepared by fusing the alkali metal in an inert liquid and subjecting the entire mixture to vigorous agitation while maintaining it at a temperature at which the alkali metal is in the molten state. The vigorous agitation can be accomplished by using a high-speed agitator such as a turbine agitator operating with sufficient force to subdivide the metal to the desired particle size. This results in a suspension of finely-divided particles of alkali metal. In general, it is desirable that all metal particles be below 500 microns in diameter with the average particle diameter being not more than about 100 microns. The average particle diameter may advantageously be lower, for example, of not more than 10 microns, and preferably of the order of three microns or less. If desired the dispersion by agitation may be followed by treatment of the dispersion in a suitable mill such as a homogenizer which will still further reduce the particle size.

The liquid medium for the metal dispersion should be non-reactive towards the alkali metal and have a boiling point above the temperature at which the dispersion is prepared, although dispersing liquids having a boiling point below such temperature may be used provided operations are carried out under pressure. High-flash hydrocarbon solvents such as white oil, mineral oils, or refined diesel fuels are advantageous dispersing liquids because of the low fire hazard they present. However, any of a wide variety of inert organic solvents or diluents, particularly those of the hydrocarbons class, such as petroleum ether, pentane, cyclopentane, hexane, cyclohexane, heptane, mineral spirits, petroleum hydrocarbons of various kinds, aromatics such as benzene, toluene, xylene and so forth, and mixtures of these materials may be used.

It is preferred that the liquid reaction media used be free of impurities which are highly reactive with the alkali metals, or with the reaction mixture components in which it is intended to be used, that is, the organic halide and the resulting organolithium product. Thus, materials such as water, alcohols, ethers, olefins and the like should preferably be absent. In selecting the liquid medium, it is to be noted that certain of the mentioned liquid reaction media, here characterized as inert, may react with the organolithium product of the reaction under certain conditions, and where occurrence thereof would be disadvantageous, the liquid medium for the metal dispersions should be selected to avoid such an effect.

If desired, dispersing agents may be employed in preparing the stated metal dispersions. Useful dispersing agents for the preparation of alkali metal dispersions are well known in the art. They include, for example, dimerized linoleic acid, oleic acid, aluminum stearate, aluminum laurate, calcium stearate, lead naphthenate, and other metallic soaps, lecithin, colloidal carbon, dispersed polymers such as polyethylene, rubbers and the like, and many others. Although the use of such agents which are useful for the facilitation of the dispersion of alkali metals in a liquid medium is not necessary in the practice of the present invention, they may be used if desired. Generally they are added to the mixture of metal and liquid medium before agitation to disperse the metal is applied.

The sodium and lithium metals will preferably be co-dispersed, that is dispersed simultaneously in the same liquid medium. It has been found that the reaction of the organic halide with a mixture of sodium and lithium dispersed separately and then mixed gives lower yields than codispersions.

The organic halide and the mixture of metals can be introduced into the reaction vessel simultaneously, or one may be added to the other. It is generally desirable to have an excess of the metal mixture present at all times so as to avoid the reaction of the product organolithium compound with the organic halide starting material, that is, the occurrence of the Wurtz or Fittig reaction. Depending on the amount of liquid provided by the metal dispersion, it may be desirable to introduce additional solvent or diluent into the reaction mixture. The liquid reaction medium for the present reaction may be an inert liquid such as those mentioned above in reference to the preparation of such dispersions. It need not be the same as that in which the metal is dispersed, although it may be.

The amounts of reactants to be used to produce substantially pure organolithium products will be at least one mole of lithium per mole of organic halide, and a total of at least two moles of metal comprising sodium and lithium per mole of organic halide. An excess of the metal mixture or an excess of the organic halide may be used if desired but generally it is advantageous, in the interest of purity of the product, to use substantially two moles total of the sodium-lithium metal mixture per mole of organic halide.

As those skilled in the art will readily appreciate, references herein to use of one mole of lithium per mole of organic halide apply to organic halides with a single reactive halogen substituent. Where a polyhalide is used, a mole of lithium will be used per gram-atom of halide, together with a second mole of metal comprising sodium per gram-atom of halide to supply metal consumed in byproduct formation.

The temperature at which the reaction mixture will be maintained during formation of the organolithium compound will generally be not substantially above about room temperature. No heating is required to induce the reactants to react, generally, and ordinarily, they react with such vigor that it is necessary to cool the reaction mixture to avoid loss of control of the reaction. The products of the reaction are also usually relatively unstable and tend to decompose on exposure to elevated temperatures. Thus the reaction temperature will generally range from about room temperature down to any temperature below that at which the reaction rate is not so greatly slowed as to be impractical. Ordinarily the reaction will be conducted at atmospheric pressure, but sub- or superatmospheric pressures may be used if desired. It is desirable to exclude air from the reaction mixture, since the components thereof are spontaneously inflammable, and thus the reaction would usually be conducted under an atmosphere of inert gas such as nitrogen, argon, and so forth. The usual procedure for carrying out the reaction will generally consist of adding the organic halide slowly to the alkali metal. The organic halide generally reacts with the alkali metal as rapidly as it is added, and reaction will be substantially complete when its addition is finished. To insure complete reaction, the reaction mixture should be stirred for a period of time, such as from 2 to 10 hours at room temperature, after addition of the organic halide is complete. It is to be appreciated that while batch procedures may often be most useful when handling a reaction mixture containing such highly reactive components as that here involved, with suitable equipment, the method of this invention may also be used in conducting the present process continuously.

After the reaction is complete, as has been mentioned, on standing, the byproduct alkali metal halide will settle out, leaving the organolithium product in the supernatant layer, as a substantially pure product. The product can be separated from the byproduct by decanting it off, or by any other convenient isolation procedure. The precipitate of byproduct metal halide comprising sodium halide can be discarded. The separated liquid portion of the reaction mixture comprising the organolithium compound product, can be stored, with suitable precautions, until use, with or without concentration thereof by removal of liquid reaction medium. Particularly unstable organolithium compounds will desirably be used immediately, and indeed they may even be used simultaneously with their preparation, as for example where the liquid medium of the reaction has weakly acid hydrogen atoms which are replaceable by the lithium of the organolithium product.

The invention is illustrated but not limited by the following examples.

Example 1

This example illustrates the preparation of an aliphatic lithium product from an aliphatic chloride.

A codispersion of sodium and lithium is prepared by high-speed agitation of an equimolar mixture of sodium and lithium in a heavy mineral oil. The dispersion is filtered, the oil washed out with pentane, and the mixture dried by evaporation. Then 38.5 grams of the product (1.28 moles of each metal) is introduced into a vessel so equipped that an argon atmosphere can be maintained above the surface of materials in the vessel. Now 100 ml. of dry hexane are added. Stirring is begun, and then 1.19 moles (110 grams) of n-butyl chloride in 900 ml. of hexane is added dropwise over a period of two hours. Initially the temperature of the reaction mixture is allowed to reach 35° C., and then external cooling is applied to maintain a temperature of 15±5° C. during the addition of the chloride. When all the chloride has been added, cooling is discontinued and stirring is continued for six hours, after which it is stopped and the mixture is allowed to settle overnight. The clear, colorless, supernatant liquid is decanted and analyzed for its ogranolithium compound content. It is found to be a substantially pure solution of n-butyllithium, containing an amount of n-butyllithium corresponding to a yield of 95% of theoretical, based on butyl chloride used.

The same reaction may also be carried out using anhydrous mineral spirits for the reaction medium, using isooctane as the dispersion medium and n-pentane as the diluting liquid added to form the reaction medium, or using other inert liquids in the reaction mixture.

Example 2

This example illustrates production of an aromatic organolithium compound by the method of the invention.

Twenty-three grams of sodium metal (1 mole) and seven grams of lithium metal (1 mole) are codispersed in toluene to provide a dispersion comprising 50% by weight of the metal mixture. Diethyl ether is added thereto to reduce the metal concentration to 10% by weight, after the dispersion has been treated in a homogenizer to reduce the average particle size to a very low value. A solution of 106 grams (0.95 mole) of chlorobenzene in 90 parts of toluene is added slowly to the sodium-lithium dispersion while the temperature is maintained at below about 25° C. during the addition. On completion of the addition, the sodium chloride precipitate is separated from the supernatant liquid portion of the reaction mixture, containing phenyllithium, substantially pure and free of organosodium compounds.

Example 3

This example illustrates the use of an amount of sodium in excess of the amount of lithium.

The procedure described in Example 1 is followed except that the sodium and lithium are dispersed in oil separately, and then the oil is washed out from the dispersions and the metals are dried and weighed. Hexane is added to a mixture of 34 grams of the sodium (1.48 moles) and 9 grams of the lithium (1.28 moles), and then 113 grams (1.22 moles) of n-butyl chloride is added, as a solution in hexane. Substantially pure n-butyllithium is isolated, in a yield of 93.5% of theoretical, based on n-butyl chloride used.

Example 4

This example illustrates use of a lower temperature of reaction, and of a higher concentration.

The procedure of Example 1 is followed, to react 34 grams of a mixture of sodium and lithium (1.13 moles of each metal) with 99.5 grams (1.07 moles) of n-butyl chloride in an amount of hexane sufficient to produce approximately a 20% concentration of the reactants. The temperature of the reaction mixture is maintained at 0° C. during addition of the chloride. The yield is 97.8% of theoretical.

Example 5

This example illustrates use of a higher temperature of reaction.

The general procedure of Example 1 is followed, to react 32 grams of a mixture of codispersed sodium and lithium (1.07 moles of each) with 94.5 grams (1.02 moles) of n-butyl chloride in hexane (approximately 10% concentration). The temperature of the reaction mixture is maintained at 30° C. during addition of the chloride. The yield of n-butyllithium is 91% of theoretical.

While the invention has been described with reference to various particular preferred embodiments thereof, it will be appreciated that modifications and variations can be made without departure from the invention.

What is claimed is:

1. In a process for the production of hydrocarbon compounds of lithium by reacting metallic lithium with a halogenated hydrocarbon the step which comprises reacting a mixture of substantially equimolar quantities of metallic lithium and sodium with the halogenated hydrocarbon in an inert solvent.

2. In the method of preparing organolithium compounds wherein the source of the organo constituent is an organic halide the improvement comprising, contacting said organic halide with a mixture of sodium metal and lithium metal in an inert reaction medium said mixture comprising at least one mol of lithium per mol of organic halide and at least one-third mol of sodium per mol of lithium.

3. In the method of preparing organolithium compounds wherein the source of the organo constituent is an organic chloride the improvement comprising contacting said organic chloride with an equimolar mixture of codispersed sodium metal and lithium metal in an inert reaction medium, and thereafter separating precipitated sodium chloride from the liquid layer of the resulting reaction mixture said liquid layer comprising the organolithium product.

4. The method of claim 2, wherein the organolithium compound produced is substantially pure.

5. The method of claim 2 in which the method by which said mixture of sodium metal and lithium metal is prepared comprises codispersing said metals.

6. The method of claim 2 in which said mixture of sodium metal and lithium metal is an equimolar mixture of said metals.

7. The method of claim 2 in which said organic halide is an organic chloride.

8. The method of claim 2 in which said organic halide is an n-alkyl chloride.

9. The method of preparing n-butyllithium which comprises contacting n-butyl chloride with a mixture of equimolar amounts of sodium and lithium metals in an inert liquid reaction medium.

References Cited by the Examiner

"Metal Organic Compounds," Vol. 23, "Advances in Chemistry Series", American Chemical Society, Washington, DC., 1959, pp. 63–68 (Nobis et al.).

"The Chemistry of Organometallic Compounds", Rochow et al., Wiley & Sons, N.Y., 1957, pages 51 and 65.

TOBIAS E. LEVOW, *Primary Examiner.*

ALPHONSO D. SULLIVAN, *Examiner.*

H. W. HAEUSSLER, E. C. BARTLETT, A. DEMERS,
*Assistant Examiners.*